Figure 1:
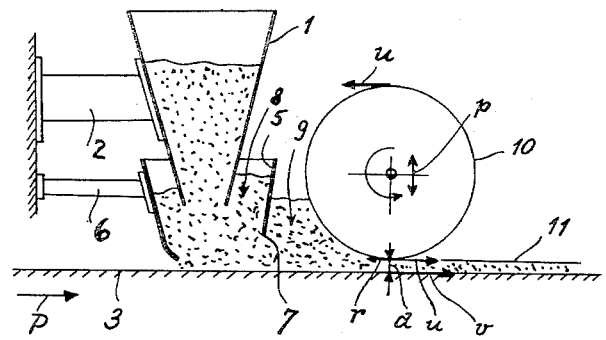

March 13, 1962 R. RABL 3,024,948
APPARATUS FOR FORMING A LAYER OF PULVERULENT MATERIAL
Filed June 24, 1958

INVENTOR:
RICHARD RABL

By Erich M. H. Radde

AGENT

United States Patent Office 3,024,948
Patented Mar. 13, 1962

3,024,948
APPARATUS FOR FORMING A LAYER OF
PULVERULENT MATERIAL
Richard Rabl, Vienna, Austria, assignor to Accumulatoren - Fabrik Aktiengesellschaft, Hagen - Westphalia, Germany
Filed June 24, 1958, Ser. No. 744,288
Claims priority, application Austria June 29, 1957
3 Claims. (Cl. 222—280)

The present invention relates to an apparatus for forming a thin and substantially even layer of a pulverulent material on a moving support. While obviously useful in any field where it is desired to form such layers, it has been found particularly advantageous in the manufacture of porous plastic plates, for instance, storage battery separator plates produced by sintering a layer of synthetic resin particles.

Conventionally, doctor blades or similar scraper means have been mounted behind the material feed means to spread pulverulent material evenly and thus to form a powder layer. It has been suggested also to use convex doctor blades so that the powder may gradually be reduced to the desired layer thickness. It has furthermore been proposed to mount a funnel-like body about and spaced from the mouth of the feeding hopper of the pulverulent material. In this improved apparatus, the funnel-like body extends below the mouth of the hopper and has a transverse edge which serves as the doctor blade for forming the powder layer. In such an apparatus, the powder rises in the interspace between the hopper and the funnel under the pressure of the material charged into the hopper and depending on the fluidity of the material until it has reached a more or less constant level. In this manner, the layer formation is largely independent of the material level changes in the hopper and an even and homogeneous spreading of the powder is assured. However, even this apparatus has been found unsatisfactory with pulverulent material having a specific surface of more than 3500 sq.cm./g. because the fluidity of such a very fine powder does not suffice to form a powder layer which is internally homogeneous and has a smooth and even surface. Such a layer is required to produce high-quality sintered synthetic resin plates, such as porous storage battery separator plates, because even minor irregularities in the powder layer tend to cause cracks during sintering.

Accordingly, it is a primary object of the present invention to provide means for forming a homogeneous and even layer of pulverulent material.

This and other objects and advantages are accomplished in accordance with this invention with an apparatus comprising feed means for feeding pulverulent material onto a moving support, a polished roller laterally spaced from the feed means and vertically spaced from the moving support a distance corresponding to the desired layer thickness, and means for rotating the polished roller in the same direction as and with a peripheral speed slightly less than the speed of the moving support. The most favorable speed differential between the moving support and the polished roller depends on the properties of the pulverulent material, and it is well within the skill of the art to adjust it experimentally according to individual operating conditions without departing from and applying the concept of the invention. Generally speaking, it has been found that the speed differential should exceed 3%, i.e., that the peripheral speed of the roller should be more than 3% less than the speed of the moving support. On the other hand, the speed differential should be less than 50% to assure satisfactory operation.

In accordance with a preferred embodiment of the invention, means a provided at the feed end to hold the level of the pulverulent material substantially constant.

According to another preferred embodiment, coupling means is provided between the means for moving the support and for rotating the polished roller, the coupling means including means for maintaining the desired speed differential between the forward moving support and the rotating roller.

In one embodiment of the invention, a counter-roller is mounted opposite the polished roller to support the moving support running between the two rollers.

Experiments have shown that a fixed roll operates like a convex doctor blade, i.e., it gradually reduces the powder mass to the desired layer thickness as the mass is carried by its moving support past the roll and between the nip of the roll and the moving support. However, pulverulent material with a very high specific surface cannot be spread homogeneously and smoothly by such a fixed roll.

On the other hand, it has also been found that some of the compressed powder sticks to the roller if it is rotated at a peripheral speed equal to the forward speed of the moving support, i.e., clods are formed behind the roller and cause an uneven layer surface. However, when there is a small relative movement between the rotating polished roller and the compressed powder in the nip of the roller, as provided in the apparatus of the present invention, so that the polished roller softly brushes over the powder layer, an absolutely smooth and even layer surface is obtained even with the finest powder.

It should be noted that the polished roller serves a double purpose. It produces a homogeneous and smooth powder layer and it lightly compresses the layer. The compression of the powder in the layer has been found of great advantage particularly in sintering pulverulent material because it tends to minimize or eliminate shrinkage of the layer during sintering, which causes cracking. All other conditions being equal, the pressure exerted upon the powder layer by the roller increases with the diameter of the roller, the specific surface of the powder, and the thinness of the layer. In other words, the larger the diameter of the polished roller, the finer the powder, and the thinner the layer, the heavier is the pressure exerted upon the powder layer by the roller.

The above and other objects, advantages and features of the present invention will be more fully understood by reference to the following detailed description of two embodiments of this invention, as illustrated in the accompanying drawing, without in any way limiting its scope to the illustrated embodiments.

Figure 2:
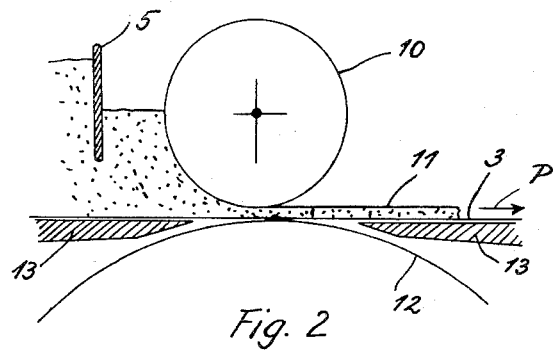

In the drawing,

FIG. 1 is a schematic side view showing essential features of one embodiment of the apparatus of the invention; and FIG. 2 is a similar side view of another embodiment.

Like reference numerals are used for like parts in both figures of the drawing to facilitate the understanding thereof.

Referring now to FIG. 1, there is shown a hopper 1 for feeding the pulverulent material onto the flat support 3 moving in the direction of arrow P. Hopper 1 is fixedly supported at a distance above the moving support 3 by arm 2. The mouth of the hopper is surrounded by a funnel-like feed member 5 which is fixedly supported by arm 6, an interspace 8 being formed between the hopper mouth and the funnel-like feed member 5. The edge 7 of the forward wall of the feed member lies relatively high above the moving support 3 so that this forward wall has the effect of a baffle member. Mounted adjacent the baffle member and forming interspace 9 therewith is a polished roller 10. Depending on the fluidity of the pulverulent material, it will rise to a certain level in interspaces 8 and 9 as it is poured into hopper 1, the level in interspace 9 being lower and more constant than that in interspace 8 because of the baffle action of the forward wall of feed member 5.

Polished roller 10 is mounted so that the nip $d$ which it forms with the moving support 3 corresponds to the desired powder layer thickness. As schematically indicated by vertical arrow $p$, it is preferred to mount the roller vertically adjustably so that the nip $d$ may be changed in accordance with any desired layer thickness. Any suitable conventional mechanical means may be used for the adjusting mounting of the roller. For instance, the axle or bearings of roller 10 may be mounted on a pivotal support means so that the roller spacing from the moving support may be changed by pivoting the support means into any desired angular position. Alternate adjustable support means for the roller will readily occur to the skilled in the art and, since this forms no part of the invention, it has not been illustrated.

Vector $v$ indicates the forward speed of the moving support 3. Vector $u$, which is parallel to and runs in the same direction as vector $v$, indicates the peripheral speed of roller 10. As indicated, the peripheral speed of the polished roller is somewhat smaller than the forward speed of the moving support upon which the powder layer 11 is formed. Accordingly, the surface of the roller has a relative speed $r$ in respect of the surface of the powder layer in the nip $d$, speed $r$ corresponding to the difference in vectors $v$ and $u$. Therefore, the roller brushes over the layer surface with small speed $r$ and thereby prevents powder particles from being picked up from the layer surface by the roller and from sticking to the roller.

Preferably and in a manner well known per se and forming no part of the invention, the drives for the moving support and the roller are coupled together, reduction gear means being provided to assure the desired speed differential between the forward movement of the support and the peripheral speed of the roller. For the sake of clarity and to permit an unencumbered view of the essential elements of the novel apparatus of the invention, the coupling and reduction gear means have not been illustrated, such means being conventional.

The transmission ratio is chosen so that the speed differential is at least about 3%, the peripheral speed of the rotating roller being less than the forward speed of the moving support.

It is obvious that the apparatus of the present invention is not limited either to any particular powdered material, nor to any particular support or roller material. Any pulverulent material which is to be formed into a homogeneous and smooth layer may effectively be treated in this apparatus, including powders of any synthetic resin as well as metal or mineral powders. Equally, any flat moving support of paper, fabric, metal or other suitable material may be used, depending primarily on the treatment to which the powder layer is to be subjected after formation and the purpose to which the powder layer is to be put, including the question as to whether the support is to be united with the layer or whether the layer is to be stripped therefrom. Roller 10 will preferably have a highly polished metal surface, such as stainless steel or other suitable metal.

The embodiment of FIG. 2 is in most respects similar to that of FIG. 1, only the different portions thereof being described hereinafter. This embodiment is particularly advantageous when the moving support 3 is a thin band or ribbon which may tear easily under pressure, such as a support of paper, fabric or a non-woven web. In this case, the moving band is guided over fixed plate or table 13 which has a slot in the range of polished roller 10, the counter-roller 12 reaching into said slot to support the band 3 in the nip between the two rollers. The roller 12 is preferably rotated at the same speed as the forward speed of the moving band. Since a thin ribbon of paper, for instance, may tear under the friction caused by the pressure of roller 10 against a fixed support for the moving ribbon, the roller support is used in this case to avoid tearing of the ribbon.

If desired, the roller 10 may be circumferentially grooved to produce a correspondingly profiled layer surface, the grooving depth not exceeding about 5% of the roller diameter.

The following examples will serve to illustrate the practice of this invention with the illustrated apparatus.

*Example 1*

Polystyrene powder having an average particle size of less than 60 microns is poured into hopper 1 having a capacity of about 2 kg. The mouth of the hopper is spaced from moving fabric band 3 about 5 cm., a funnel-shaped member, such as shown at 5, surrounding hopper 1 at a distance of about 1 cm. to form interspace 8 between the hopper and the funnel-shaped member. While the back edge of the funnel-shaped member is adjacent the moving fabric band 3, its forward edge is spaced about 1, 2 cm. therefrom. Roller 10 with a highly polished stainless steel surface is mounted at a distance of 3 cm. from the forward wall 5 of the funnel-shaped member. The diameter of the roller is 4 cm. and its bearings are so adjusted that it formed a nip $d$ of 1.9 mm. with the moving band. The transmission ratio between the band drive and the drive for the roller is so adjusted that the peripheral speed of the roller is 0.6 m./per minute while the forward speed of the band is 0.9 m./per minute. A homogeneous and smooth layer of polystyrene powder is formed.

*Example 2*

Substantially the same apparatus as hereinabove described is used with a paper ribbon supported on a table and moving thereover. The table has a slot facing the polished roller $w$, as shown in FIG. 2, the counter-roller 12 being rotated at the same speed as the moving paper band. Otherwise, the same operating conditions were observed.

When the invention is used for the production of storage battery separator plates, the flexible moving support, which becomes a part of the finished plate, may be paper, or a woven or non-woven fabric, while any synthetic resin powder which may be sintered can be used, such as polyvinyl resins, including polyvinyl chloride or acetate, polyvinyl carbazole, polystyrene, acrylic acid and methacrylic acid polymers and polyesters, polyethylene, vinyl chloride-vinyl acetate copolymer sold under the trademark "Vinyon," and blends and copolymers of such and similar resins.

While the invention has been described and illustrated in conjunction with certain now preferred embodiments, it will be clearly understood that many modifications and variations may occur to the skilled in the art, particularly after they have been benefited from the present teaching, without departing from the spirit and scope of this invention as defined in the appended claims.

Separator plates for storage batteries may be prepared from the resulting resin layers, for instance, as described in copending application Serial No. 744,284, filed on even date herewith and entitled "Method of and apparatus for the production of porous synthetic resin plates, and plates so produced."

I claim:

1. An apparatus for feeding a pulverulent material onto a horizontal moving support and forming a layer of said material on the support, said apparatus comprising means for feeding the material, a moving support having a continuous surface and carrying the pulverulent material layer on said surface, and a polished cylindrical roller laterally spaced from the material feeding means, and vertically spaced from the continuous surface of the moving support a fixed distance corresponding to the desired layer thickness and means for rotating the roller in the same direction as and with a peripheral speed less than the speed of the moving support.

2. The apparatus of claim 1, wherein the speed differential between the moving support and the rotating roller exceeds 3%.

3. An apparatus for feeding a pulverulent material onto a horizontal forward moving support and forming a layer of said material on the support, said apparatus comprising means for feeding the material, a moving support having a continuous surface and having a forward moving speed and carrying the pulverulent material on said surface, baffle means spaced laterally from the feed means and spaced vertically from the moving support, a polished cylindrical roller laterally spaced from the baffle means, the baffle means holding the level of the pulverulent material substantially constant at the roller, and said polished cylindrical roller being vertically spaced from the continuous surface of the moving support a fixed distance corresponding to the desired layer thickness and means for rotating the roller in the same direction as the moving support with a peripheral speed of at least 3% less than the forward speed of the moving support.

References Cited in the file of this patent

UNITED STATES PATENTS

| | | |
|---|---|---|
| 86,391 | Greenlee | Feb. 2, 1869 |
| 979,548 | Norton | Dec. 27, 1910 |
| 1,653,991 | Davis | Dec. 27, 1927 |
| 1,897,904 | Hurxthal | Feb. 14, 1933 |
| 2,756,459 | Kellner | July 31, 1956 |